(12) United States Patent
Lee

(10) Patent No.: US 9,678,908 B2
(45) Date of Patent: Jun. 13, 2017

(54) METHOD FOR AUTOMATICALLY SETTING ID IN UART RING COMMUNICATION

(71) Applicant: LSIS CO., LTD., Anyang-si, Gyeonggi-do (KR)

(72) Inventor: Bong Ki Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 283 days.

(21) Appl. No.: 14/494,349

(22) Filed: Sep. 23, 2014

(65) Prior Publication Data

US 2015/0095536 A1    Apr. 2, 2015

(30) Foreign Application Priority Data

Oct. 2, 2013 (KR) .......................... 10-2013-0117699

(51) Int. Cl.
| | | |
|---|---|---|
| *G06F 13/00* | (2006.01) | |
| *G06F 3/00* | (2006.01) | |
| *G06F 13/362* | (2006.01) | |
| *H04L 7/10* | (2006.01) | |
| *H04L 5/02* | (2006.01) | |
| *G06F 13/42* | (2006.01) | |

(52) U.S. Cl.
CPC ........ *G06F 13/362* (2013.01); *G06F 13/4291* (2013.01); *H04L 5/02* (2013.01); *H04L 7/10* (2013.01)

(58) Field of Classification Search
CPC .................................. H04L 45/02; H04L 7/10
USPC ....................................................... 710/9, 110
See application file for complete search history.

(56) References Cited

U.S. PATENT DOCUMENTS

| | | | | | |
|---|---|---|---|---|---|
| 4,700,230 | A | * | 10/1987 | Pshtissky | ............... H04N 5/268 348/159 |
| 5,768,277 | A | * | 6/1998 | Ohno | ................ H04L 29/12254 340/9.16 |
| 5,928,343 | A | * | 7/1999 | Farmwald | ............. G06F 11/006 710/104 |
| 6,343,331 | B1 | * | 1/2002 | Stirling | ............... G06F 12/0669 709/251 |
| 6,700,877 | B1 | * | 3/2004 | Lorenz | .................. H04L 12/403 370/254 |

(Continued)

FOREIGN PATENT DOCUMENTS

JP    05-344137    12/1993

OTHER PUBLICATIONS

European Patent Office Application Serial No. 14186412.4, Search Report dated Jul. 16, 2015, 5 pages.

*Primary Examiner* — Faisal M Zaman
(74) *Attorney, Agent, or Firm* — Lee, Hong, Degerman, Kang & Waimey PC

(57) ABSTRACT

Disclosed is a method for automatically setting ID in UART ring communication in which a master and a plurality of slaves are formed in a ring-type network, the method including initializing the master to output a master ID (initializing step), receiving, by the plurality of slaves, the master ID, setting its own IDs by adding the master ID to a reference value and outputting the set ID (slave ID setting step), changing, by the plurality of slaves, its own IDs based on whether its own ID is same as the received ID, receiving, by the master, the IDs outputted by the plurality of slaves, and changing a currently highest value of slave IDs stored in the master in response to values of received slave IDs (changing step), and finishing the ID setting or re-setting the slave IDs, in response to the Current Max Slave ID (finish determining step).

10 Claims, 3 Drawing Sheets

(56) References Cited

U.S. PATENT DOCUMENTS

| | | | | |
|---|---|---|---|---|
| 6,854,053 B2* | 2/2005 | Burkhardt | | G06F 15/17 340/9.1 |
| 7,437,494 B2* | 10/2008 | Ellerbrock | | G06F 13/387 709/209 |
| 7,694,050 B1* | 4/2010 | Chan | | G06F 13/4226 710/104 |
| 7,747,804 B2* | 6/2010 | Wang | | H04L 12/403 710/105 |
| 2001/0044874 A1* | 11/2001 | Watanabe | | G06F 12/0676 711/105 |
| 2003/0074505 A1 | 4/2003 | Andreas et al. | | |
| 2006/0013208 A1* | 1/2006 | Rietschel | | H04J 3/0664 370/389 |
| 2007/0234071 A1 | 10/2007 | Pyeon | | |
| 2008/0301344 A1* | 12/2008 | Hsieh | | G06F 13/4282 710/110 |
| 2009/0180483 A1* | 7/2009 | Przybylski | | G06F 13/4243 370/400 |
| 2009/0327550 A1* | 12/2009 | Li | | G06F 13/4226 710/110 |
| 2012/0271924 A1* | 10/2012 | Spitaels | | H04L 61/2092 709/220 |

\* cited by examiner

METHOD FOR AUTOMATICALLY SETTING ID IN UART RING COMMUNICATION

CROSS-REFERENCE TO RELATED APPLICATION

Pursuant to 35 U.S.C. §119(a), this application claims the benefit of earlier filing date and right of priority Korean Patent Application No. 10-2013-0117699, filed on Oct. 2, 2013, the contents of which are hereby incorporated by reference herein in its entirety.

BACKGROUND OF THE DISCLOSURE

1. Field of the Disclosure

Exemplary embodiments of the present disclosure generally relate to a method for automatically setting ID in UART ring communication, and more particularly to a method for automatically setting ID in UART ring communication configured to allow an intrinsic ID (Identification) setting of communication devices mutually transmitting/receiving data by being connected to a network to be automatically on the network.

2. Discussion of the Related Art

Communication is a series of systems that exchanges required data among devices, and UART (Universal Asynchronous Receiver/Transmitter) is a micro chip that contains a program configured to control an interface toward serial devices attached to a computer, and can communicate with a modem or other serial devices or exchange data. A UART communication using the UART is a universal communication embedded in a general CPU and generally used for communication among devices. A device configured to control communication flow in a communication network is called a master and a device configured to perform an operation corresponding thereto in response to a signal of the master is called a slave, and an intrinsic ID must be available at each device for the communication.

In general, an intrinsic ID is set up by a user, and when a user erroneously sets up an intrinsic ID, collision occurs among devices when devices each having an identical ID are available on a same network, whereby no communication may be generated.

A ring topology in a communication topology is a type of communication network in which devices form a ring-type network to allow data transmission to be realized in adjacent devices.

FIG. 1 is a schematic view illustrating a data flow in a conventional ring-type network, where a master (10) and a plurality of slaves (11, 12, 13) are connected to adjacent devices through one communication line (L1, L2, L3, L4), and when the master (10) requests data from a slave configured to receive a data, the requested slave outputs the data to the communication line and the data is finally transmitted to the master (10) through the adjacent slaves.

For example, when the master (10) outputs a data request signal to request a data of No. 2 slave (12), the data request signal is transmitted to the No. 2 slave (12) through the communication lines (L1, L2) and when the No. slave (12) outputs a data signal, the outputted data signal is transmitted to the master (10) through the communication lines (L3, L4). At this time, when two or more slaves in the plurality of slaves (11, 12, 13) are set to have an identical ID, the two or more slaves having the same ID output all data to the communication lines, there may occur collisions on the communication lines to disable a smooth communication.

The disablement of smooth communication due to data collision on the communication lines is because slaves have the same ID, and the ID setting error is largely generated by erroneous setting by a user in the course of directly setting the ID.

SUMMARY OF THE DISCLOSURE

The present disclosure is directed to cope with the above-mentioned problems/disadvantages and it is an object of the present disclosure to provide a method for automatically setting ID in UART ring communication configured to allow an intrinsic ID (Identification) setting of communication devices mutually transmitting/receiving data by being connected to a network to be automatically on the network.

In a general aspect of the present disclosure, there is provided a method for automatically setting ID in UART ring communication in which a master and a plurality of slaves are formed in a ring-type network, the method comprising:

initializing the master to output a master ID (initializing step);

receiving, by a plurality of slaves, the master ID, setting its own IDs by adding the master ID to a reference value and outputting the set ID (slave ID setting step);

changing, by the plurality of slaves, its own IDs based on whether its own ID is same as the received ID, receiving, by the master, the IDs outputted by the plurality of slaves, and changing a currently highest value of slave IDs stored in the master in response to values of received slave IDs (changing step); and finishing the ID setting or re-setting the slave IDs, in response to the Current Max Slave ID (finish determining step).

Preferably, but not necessarily, the initializing step may include initializing the master ID, the Current Max Slave ID and an Old Max Slave ID.

Preferably, but not necessarily, the changing step may include changing, by a slave having received an ID same as its own ID among the plurality of slaves, a value in which its own ID value is added by the reference value, to its own ID.

Preferably, but not necessarily, the changing step may include changing an ID value having a highest value among slave IDs received by the master to a Current Max Slave ID.

Preferably, but not necessarily, the finish determining step may include comparing the Current Max Slave ID with an automatic setting finish ID stored in the master and finishing the ID setting when the Current Max Slave ID is same as the automatic setting finish ID stored in the master (setting finish step).

Preferably, but not necessarily, the setting finish step may include outputting, by the master, a setting finish signal to the slaves.

Preferably, but not necessarily, the finish determining step may include comparing the Current Max Slave ID with the automatic setting finish ID stored in the master and re-setting the slave IDs when the Current Max Slave ID is not same as the automatic setting finish ID stored in the master (slave ID re-setting step).

Preferably, but not necessarily, the re-setting step may include:

determining whether the Current Max Slave ID is same as an Old Max Slave ID stored in the master (Max determining step);

changing the Old Max Slave ID to the Current Max Slave ID when the Current Max Slave ID is not same as the Old Max Slave ID stored in the master in the Max determining step (Old Max changing step); and outputting, by the master, the master ID to respond to the master ID, and outputting, by the plurality of slaves, its own IDs (slave ID outputting step).

Preferably, but not necessarily, the Max determining step may include outputting, by the master, an automatic setting finish ID when the Current Max Slave ID is same as the Old Max Slave ID stored in the master (automatic setting finish ID outputting step).

Preferably, but not necessarily, the automatic setting finish ID outputting step may return to the changing step subsequent to the slave ID outputting step and the automatic setting finish ID outputting step.

Advantageous Effects of the Disclosure

The method for automatically setting ID in UART ring communication according to the present disclosure has an advantageous effect in that an ID in UART ring communication can be automatically set on a network, whereby a user is free from a direct setting of ID to thereby prevent a setting error generated when the user artificially sets an ID and to also prevent data collision on a network.

Another advantageous effect is that the prevention of data collision on the network enables a smooth communication among communication devices, whereby a user can use a desired data under a fast data communication environment.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION OF THE DISCLOSURE

Figure 1:
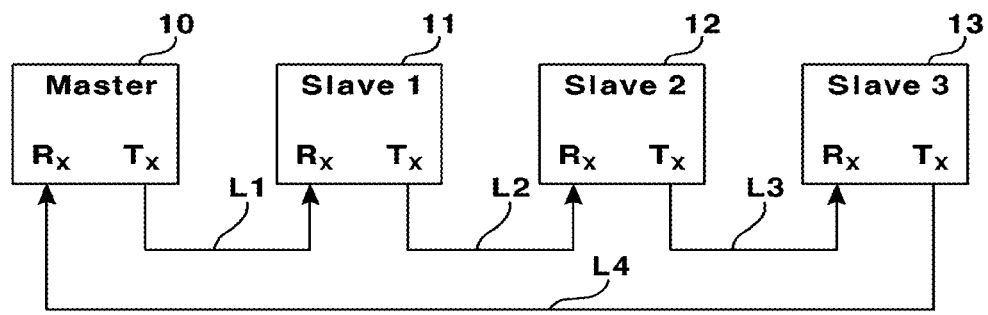
FIG. 1 is a schematic view illustrating a data flow in a conventional ring-type network.

Now, exemplary embodiments of the present disclosure will be described in detail with reference to the accompanying drawings, so that one of ordinary skill in the art can easily implement the present disclosure upon examination of the figures and detailed description. In the drawings, the width, length, thickness, etc. of components may be exaggerated or reduced for the sake of convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 3:
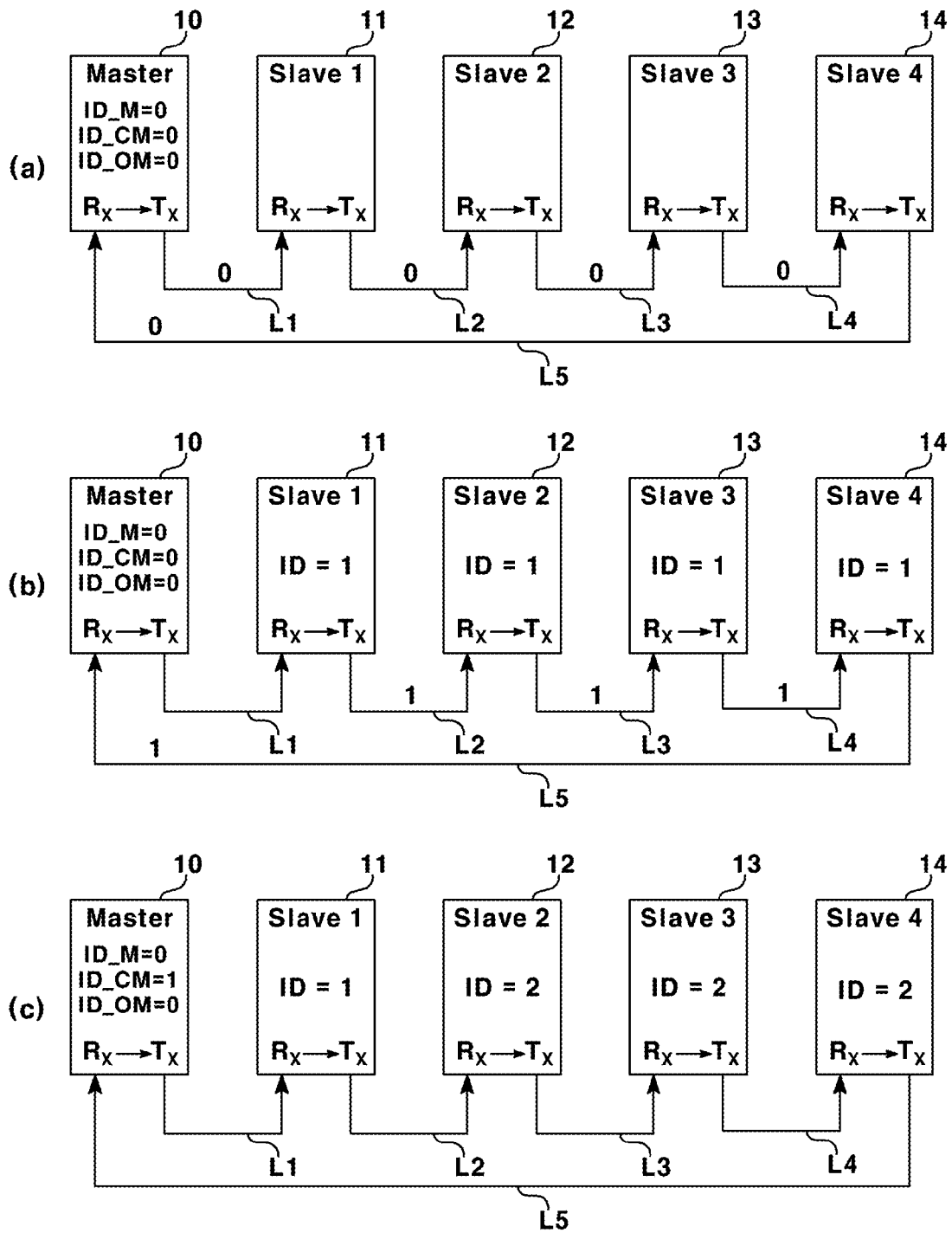
FIGS. 3 and 4 are schematic views illustrating a set ID value for each step and a flow in a method for automatically setting ID in UART ring communication according to an exemplary embodiment of the present disclosure.
Figure 4:
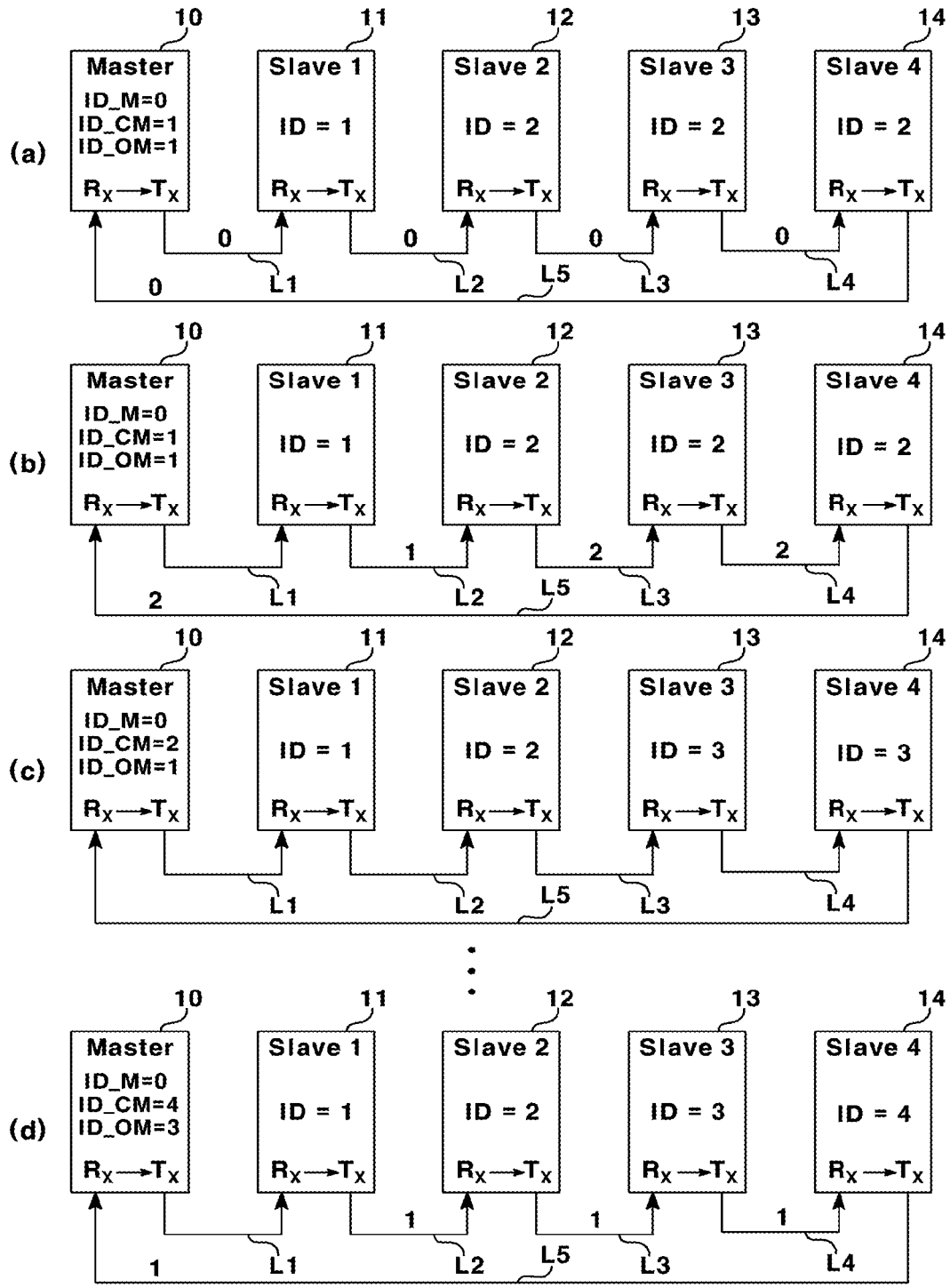

Hereinafter, a method for automatically setting ID in UART ring communication on a network where a master and slaves are arranged in a ring-type as shown in FIGS. 3 and 4. At this time, the ring type network according to an exemplary embodiment of the present disclosure may have a configuration as in FIG. 1, such that description will be made with reference to the configuration in FIG. 1.

The ring-type network according to an exemplary embodiment of the present disclosure may include a master (10), a plurality of slaves (11, 12, 13, 14) and a plurality of communication lines (L1, L2, L3, L4, L5) connecting adjacent (mutually neighboring) devices among the devices (10, 11, 12, 13, 14).

That is, the first communication line (L1) connects the master (10) to the first slave (11), the second communication line (L2) connects the first slave (11) to the second slave (12), the third communication line (L3) connects the second slave (12) to the third slave (13), the fourth communication line (L4) connects the third slave (13) to the fourth slave (14), and the fifth communication line (L5) connects the fourth slave (14) to the master (10). Thus, data outputted from the slaves (11~14) are finally transmitted to the master (10) through a slave situated at a next stage and a communication line connecting therebetween.

At this time, each of the master (10) and the plurality of slaves (11~14) has a transmission terminal (Tx) and a receiving terminal (Rx), where the data received through the receiving terminal (Rx) may be outputted through the transmission terminal (Tx).

Meantime, although the exemplary embodiment of the present disclosure has described a network of one master and four slaves for convenience sake, the present disclosure is not limited thereto. Thus, the number of slaves is not limited thereto and more slaves may be configured on the network in an extended form.

Figure 2:
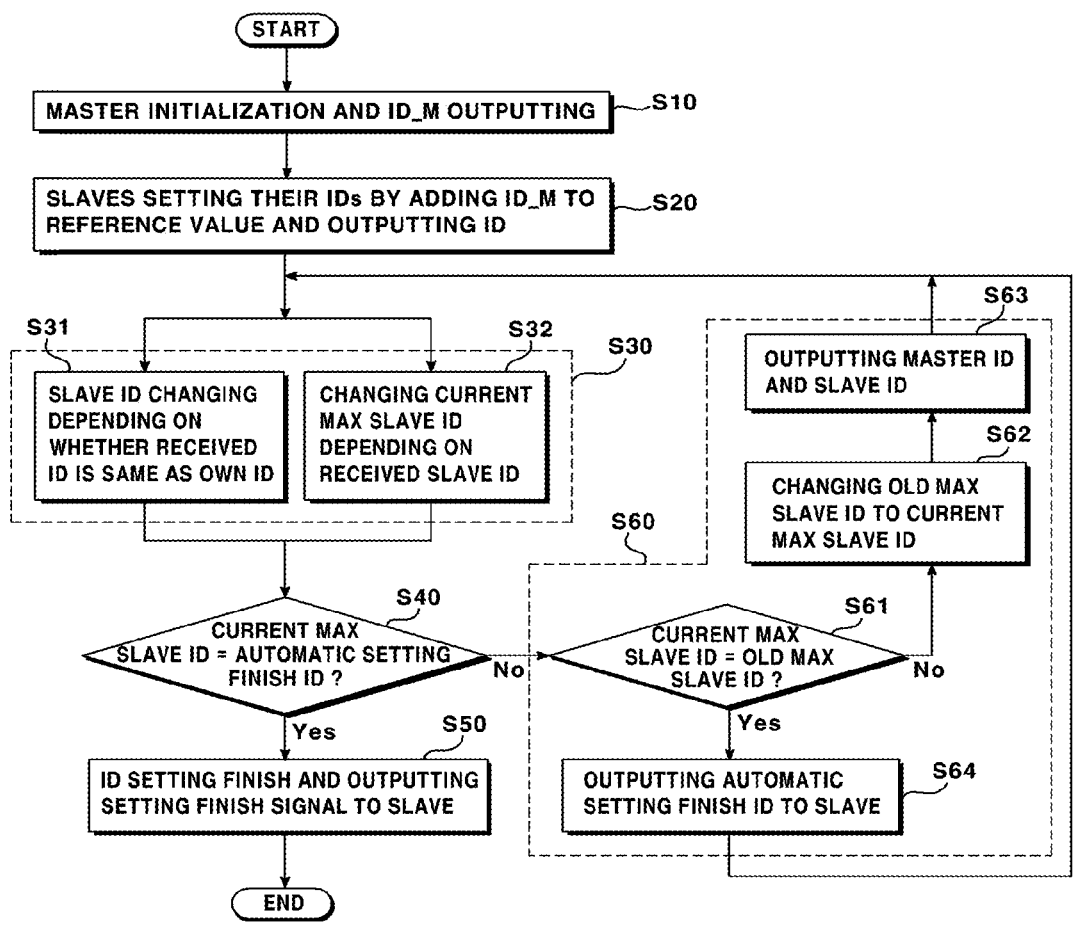
FIG. 2 is a flow chart illustrating an order of setting an ID in a method for automatically setting ID in UART ring communication according to an exemplary embodiment of the present disclosure.

FIG. 2 is a flow chart illustrating an order of setting an ID in a method for automatically setting ID in UART ring communication according to an exemplary embodiment of the present disclosure, and FIGS. 3 and 4 are schematic views illustrating a set ID value for each step and a flow in a method for automatically setting ID in UART ring communication according to an exemplary embodiment of the present disclosure.

Referring to FIGS. 2, 3 and 4, in the method for automatically setting ID in UART ring communication according to an exemplary embodiment of the present disclosure, an initializing step is performed where the master (10) is first initialized and a master ID (ID_M), which is an ID of the master itself is outputted (S10). At this time, the master ID (ID_M), a current slave ID highest value (Current Max Slave ID: 'ID_CM') and a past highest slave ID value (Old Max Slave ID: 'ID_OM') are initialized to '0' and the master ID (ID_M) is outputted.

Although not illustrated, the master (10) is set with an automatic setting finish ID, and the automatic setting finish ID forms a first network to be set in the master (10), and when the slave ID received by the master is same as the automatic setting finish ID, the ID automatic setting according to the present disclosure is finished.

The exemplary embodiment of the present disclosure describes an exemplary case where the automatic setting finish ID is set at '40. However, it would be preferable that the automatic setting finish ID be set with reference to a total number of slaves.

As in FIG. 3(*a*), the master ID (ID_M) outputted from the master (10) is transmitted along the first to fourth transmission lines (L1~L4), and therefore, all the slaves connected by forming a ring-type network with the master (10), that is, the first to fourth slaves (11, 12, 13, 14), receive the master ID (ID_M).

Next, all the plurality of slaves sets its ID by adding the master ID (ID_M) by a reference value, where a slave ID setting step (S20) outputting the set ID is performed.

The exemplary embodiment of the present disclosure describes an exemplary case where the reference value is set at '1', and, as a result, and as illustrated in FIG. 3(*b*), the plurality of slaves (11~14) sets the '1' ('0' which is a value of the master ID is added by the reference value of '1') as its ID, and outputs '1', whereby the plurality of slaves (11~14) sets '1', which is the same value, as its own ID, and outputs '1'. The IDs outputted from the slaves (11~14) is finally transmitted to the master through the communication lines, and, because all the slaves (11~14) equally output '1' as their IDs, the master (10) receives the '1'.

Next, as illustrated in FIG. 3 (*c*), the slaves change their IDs depending on whether the received ID is same as own ID (S31), and a changing step (S30) is performed where a Current Max Slave ID is changed in response to the slave ID values. At this time, a slave having received same ID as its own ID among the slaves (11~14) is changed in terms of ID, while the IDs of slaves having received different IDs from their own IDs remain unchanged. Thus, the slave having received same IDs as its own ID among the slaves (11~14) change a value (in which its own ID value is added by the reference value) to its own ID.

Meantime, the highest value among the ID values of the slaves received by the master is changed to a Current Max Slave ID (ID_CM). Thus, as ascertained in FIG. 3 (*c*), the master (10) has received only an ID which is '1', such that the Current Max Slave ID (ID_CM) is set at '1'. Furthermore, the first slave (11) has not received an ID from a slave positioned at a front stage, an ID of the first slave (11) is set at '1', and IDs of the second, third and fourth slaves (12~14) having received the ID same as their own ID is set at '2' (in which '1', which is own ID value, is added by the reference value) as ID.

Next, the ID setting is finished in response to the Current Max Slave ID (ID_CM), or a finish determining step (S40) is performed that re-sets the slave ID. At this time, a comparison is made between the Current Max Slave ID (ID_CM) and the automatic setting finish ID, and when the Current Max Slave ID (ID_CM) and the automatic setting finish ID are same, a setting finish step (S50), in which the ID setting is finished, is performed.

At this time, when the ID setting is finished, the master (10 outputs a setting finish signal to the slaves (11~14) in order to notify that the ID setting is finished.

Meanwhile, when the Current Max Slave ID (ID_CM) and the automatic setting finish ID are not same, a slave ID re-setting step (S60) is performed in which the slave ID is re-set.

Although the present disclosure sets the automatic setting finish ID at '4', and because the Current Max Slave ID (ID_CM) is set at '1' in case of FIG. 3(*a*), the slave ID re-setting step (S60) is performed due to the automatic setting finish ID and the Current Max Slave ID (ID_CM) not being same.

According to the slave ID re-setting step (S60), a Max determining step (S61) is first performed to determine whether the Current Max Slave ID is same as an Old Max Slave ID (ID_OM) stored in the master. When the Current Max Slave ID is not same as an Old Max Slave ID (ID_OM), an Old Max changing step (S62) is performed to change the Old Max Slave ID to the Current Max Slave ID when the Current Max Slave ID is not same as the Old Max Slave ID stored in the master, as shown in FIG. 4 (*a*). Subsequently, as shown in FIGS. 4(*a*) and 4(*b*), a slave ID outputting step (S63) is performed in which the master (10) outputs a master ID (ID_M) to respond to the master ID, and the plurality of slaves (11~14) outputs its own ID.

Thereafter, the flow returns to the changing step (S30), and as illustrated in FIG. 4 (*c*), the slave IDs are changed and the Current Max Slave ID is changed, and these steps are performed until ID setting is finished in which all the slaves (11~14) are set at mutually different IDs.

Meanwhile, when the Current Max Slave ID (ID_CM) is same as the Old Max Slave ID (ID_OM), an automatic setting finish ID outputting step (S64) is performed in which the master outputs an automatic setting finish ID to the slaves (11~14).

Subsequently, the flow returns to S30, the slave IDs are changed and the Current Max Slave ID is changed. Meanwhile, the master (10) outputs to the slaves (11~14), where the slaves (11~14) positioned at the last stage among the slaves (11~14) finally output a value same as the automatic setting finish ID. Thus, the master (10) receives the automatic setting finish ID, the ID automatic setting is finished, because the Current Max Slave ID (ID_CM) is same as the automatic setting finish ID at the finish determining step (S40). That is, when the Current Max Slave ID (ID_CM) is same as the Old Max Slave ID (ID_OM), the automatic setting finish ID is outputted to the slave, and when the automatic setting finish ID is received again, the ID automatic setting is finished.

As apparent from the foregoing, although the method for automatically setting ID in UART ring communication according to the present disclosure has been described with reference to a number of limited illustrative embodiments thereof, it should be understood that numerous other modifications and embodiments can be devised by those skilled in the art that will fall within the spirit and scope of the principles of this disclosure.

Therefore, it should be understood that the above-described embodiments are not limited by any of the details of the foregoing description and drawings, unless otherwise specified, but rather should be construed broadly within the scope as defined in the appended claims.

What is claimed is:

1. A method for automatically setting ID in UART ring communication in which a master and a plurality of slaves are formed in a ring-type network, the method comprising:
   initializing the master to output a master ID;
   receiving, by each of the plurality of slaves, the master ID, and setting its own slave ID obtained by adding the master ID to a reference value and outputting the slave ID;
   changing, by each of the plurality of slaves, its own slave ID when its own slave ID is the same as a slave ID output by another slave of the plurality of slaves,
   receiving, by the master, the slave IDs outputted by the plurality of slaves, and changing a current max slave ID value stored at the master in response to the received slave IDs; and
   finishing the ID setting or repeating setting IDs of the plurality of slaves based on the current max slave ID value.

2. The method of claim 1, wherein the method further comprises initializing the master ID, the current max slave ID value and a previous max slave ID value.

3. The method of claim 1, wherein the method further comprises adding, by each of the plurality of slaves, its own slave ID to a reference value when its own slave ID is the same as the slave ID output by another slave.

4. The method of claim 1, wherein the method further comprises changing the current max slave ID by setting the current max slave ID value stored at the master to a highest slave ID received by the master.

5. The method of claim 1, wherein the method further comprises:
   comparing the current max slave ID value to an automatic setting finish ID value stored at the master; and
   finishing the ID setting when the current max slave ID value is the same as the automatic setting finish ID value.

6. The method of claim 5, wherein the method further comprises outputting, by the master, a setting finish signal to the plurality of slaves.

7. The method of claim 1, wherein the method further comprises:
   comparing the current max slave ID value to the automatic setting finish ID value stored at the master; and
   repeating setting IDs of the plurality of slaves when the current max slave ID value is different than the automatic setting finish ID value stored at the master.

8. The method of claim 7, wherein repeating setting IDs of the plurality of slaves comprises:
   determining whether the current max slave ID value is the same as a previous max slave ID value stored at the master;
   changing the previous max slave ID value to the current max slave ID value when the current max slave ID value is different from the previous max slave ID value stored at the master; and
   outputting, by the master, the master ID, and outputting, by the plurality of slaves, the slave IDs corresponding to the plurality of slaves.

9. The method of claim 8, wherein the method further comprises outputting, by the master, an automatic setting finish ID when the current max slave ID value is the same as the previous max slave ID value stored at the master.

10. The method of claim 9, wherein the method further comprises finishing the ID setting or repeating setting IDs of the plurality of slaves based on the current max slave ID value when the automatic setting finish ID is output.

* * * * *